(12) United States Patent
Yamamoto et al.

(10) Patent No.: US 10,497,965 B2
(45) Date of Patent: Dec. 3, 2019

(54) BATTERY PACK AND MANUFACTURING METHOD THEREFOR

(71) Applicant: Sony Corporation, Tokyo (JP)

(72) Inventors: Takeru Yamamoto, Fukushima (JP); Ken Segawa, Fukushima (JP); Toshiro Endo, Fukushima (JP); Masaru Hiratsuka, Kanagawa (JP)

(73) Assignee: Murata Manufacturing Co., Ltd., Kyoto (JP)

(*) Notice: Subject to any disclaimer, the term of this patent is extended or adjusted under 35 U.S.C. 154(b) by 228 days.

(21) Appl. No.: 15/370,522

(22) Filed: Dec. 6, 2016

(65) Prior Publication Data

US 2017/0084948 A1    Mar. 23, 2017

Related U.S. Application Data

(63) Continuation of application No. 12/361,036, filed on Jan. 28, 2009, now Pat. No. 9,525,158.

(30) Foreign Application Priority Data

Jan. 29, 2008 (JP) ................................. 2008-017289

(51) Int. Cl.
*H01M 10/0525* (2010.01)
*H01M 2/02* (2006.01)

(52) U.S. Cl.
CPC ....... *H01M 10/0525* (2013.01); *H01M 2/021* (2013.01); *H01M 2/0207* (2013.01); *H01M 2/0275* (2013.01); *H01M 2/0287* (2013.01); *H01M 2/0217* (2013.01); *H01M 2220/30* (2013.01); *Y10T 29/49115* (2015.01)

(58) Field of Classification Search
CPC .............................................. B05D 1/002–005
See application file for complete search history.

(56) References Cited

U.S. PATENT DOCUMENTS

| 4,360,245 | A | 11/1982 | Nikitas |
| 4,604,435 | A | 8/1986 | Koshii et al. |
| 5,561,004 | A | 10/1996 | Bates et al. |
| 6,225,778 | B1 | 5/2001 | Hayama et al. |

(Continued)

FOREIGN PATENT DOCUMENTS

| CN | 1753237 A | 3/2006 |
| CN | 1937281 A | 3/2007 |

(Continued)

OTHER PUBLICATIONS

Reexamination Decision dated Feb. 9, 2018 in corresponding Chinese Application No. 201310435481.4.

(Continued)

*Primary Examiner* — Robert S Carrico
(74) *Attorney, Agent, or Firm* — K&L Gates LLP

(57) ABSTRACT

A battery pack has a battery obtained by packing a battery element with a packing member. The battery element is formed by winding or laminating an anode and a cathode through separators. The battery pack includes frame member surrounding the packing member packing the battery element and a coating layer constituted of a curable resin formed on surfaces of the packing member which are surrounded and demarcated by the frame member.

15 Claims, 11 Drawing Sheets

(56) References Cited

U.S. PATENT DOCUMENTS

| | | | |
|---|---|---|---|
| 6,258,480 B1 * | 7/2001 | Moriwaki | H01M 2/023 |
| | | | 29/623.1 |
| 6,861,821 B2 | 3/2005 | Masumoto et al. | |
| 6,881,371 B2 | 4/2005 | Iwaizono et al. | |
| 7,285,334 B1 | 10/2007 | Yamashita et al. | |
| 2002/0160211 A1 | 10/2002 | Kurita et al. | |
| 2003/0003357 A1 | 1/2003 | Tamai et al. | |
| 2003/0173709 A1 | 9/2003 | Iwaizono et al. | |
| 2004/0183215 A1 * | 9/2004 | Fujieda | C08G 59/68 |
| | | | 257/793 |
| 2004/0265688 A1 | 12/2004 | Arao et al. | |
| 2005/0037259 A1 | 2/2005 | Maruyama | |
| 2006/0105237 A1 | 5/2006 | Oh | |
| 2006/0234119 A1 | 10/2006 | Kruger et al. | |
| 2006/0257731 A1 | 11/2006 | Yoon | |
| 2006/0266542 A1 | 11/2006 | Yoon | |
| 2007/0264535 A1 | 11/2007 | Lee et al. | |
| 2008/0233472 A1 | 9/2008 | Ota et al. | |

FOREIGN PATENT DOCUMENTS

| | | |
|---|---|---|
| JP | 2003-346740 A | 12/2003 |
| JP | 3556875 B2 | 8/2004 |
| JP | 2004-296334 A | 10/2004 |
| JP | 3614767 B2 | 1/2005 |
| JP | 3643792 B2 | 4/2005 |
| JP | 2006-310298 A | 11/2006 |
| JP | 2007-073313 A | 3/2007 |
| JP | 3929839 B2 | 6/2007 |
| JP | 2008-041621 A | 2/2008 |
| KR | 10-2007-0000014 A | 1/2007 |
| WO | 2006/046343 A1 | 5/2006 |

OTHER PUBLICATIONS

Korean Office Action dated Dec. 30, 2014, for corresponding Korean application No. 10-2009-0006551.

Japanese Office Action dated Dec. 2, 2014, for corresponding Japanese application No. 2013-214345.

Notifications of reasons for refusal issued in connection with Japanese application No. 2008-017289, dated Dec. 4, 2012 (5 pages).

State Intellectual Property Office of the People's Republic of China, Office Action for CN Patent Application No. 201310435481.4 (related to above-captioned patent application), dated Sep. 6, 2017.

* cited by examiner

BATTERY PACK AND MANUFACTURING METHOD THEREFOR

CROSS-REFERENCE TO RELATED APPLICATIONS

The present application is a continuation of U.S. application Ser. No. 12/361,036, filed Jan. 28, 2009, which claims priority to Japanese Application No. 2008-017289, filed Jan. 29, 2008, the disclosures of which are hereby incorporated herein by reference.

BACKGROUND

1. Field of the Invention

The present invention relates to a battery pack containing therein a battery such as, e.g., a nonaqueous electrolyte secondary battery, and a manufacturing method therefor. More particularly, the invention relates to a battery pack having a battery obtained by packing a battery element, which is formed by winding or laminating an anode and a cathode through separators, with a packing member, and a manufacturing method therefor.

2. Description of Related Art

In recent years, many portable electronics, such as camera-incorporated video tape recorders, portable telephones, and portable computers, have been marketed, and efforts have been made to make them smaller and lighter.

As electronics become small and light, a battery pack used as their portable power supply demands not only high energy but also smaller size and lighter weight. Among batteries used for such a battery pack is a lithium ion secondary battery having high capacity.

In the lithium ion secondary battery, a battery element having an anode and a cathode capable of doping/dedoping lithium ions is sealed in a metallic can or a metallic laminate film, and control is performed by a circuit board electrically connected to the battery element.

Furthermore, some related-art lithium ion secondary batteries are configured such that a lithium ion secondary battery is encased in a casing vertically split into two parts, together with a circuit board to form a battery pack (see, e.g., Japanese Patents Nos. 3556875, 3614767, and 3643792).

SUMMARY

By the way, in related-art lithium ion secondary batteries such as mentioned above, those using the metallic can for sealing the battery element can easily ensure high dimensional accuracy, but are slightly thicker and heavier.

Meanwhile, those using the metallic laminate film for sealing the battery element are thinner and lighter than those using the metallic can, but have shortcomings that it is difficult to increase the dimensional accuracy due to large variations in the size of the battery element, and hence that their mechanical strength is low.

Furthermore, in those related-art battery packs in which the lithium ion secondary battery and the circuit board are encased in the casing, the casing need be thick enough to protect the lithium ion secondary battery and the circuit board from external shock and the like.

In addition, even in bonding the vertically split parts of the casing with a double-sided adhesive tape, by ultrasonic fusion-bonding, or the like, the casing need be thick enough to accommodate these methods. Hence, the thickness and weight of the battery pack as a whole increase, thereby imposing an issue that such batteries are not suitable as the portable power supply.

In coating a resin integrally on surfaces of a battery as a packaging material, a metallic can and the resin are integrally molded using molds, as disclosed in, e.g., Japanese Patents Nos. 3556875, 3614767, and 3929839.

However, there have been three roughly identified issues: (a) when a film-shaped packing member is used instead of a metallic can, the packing member as a middle member has a large dimensional tolerance so that its positioning is difficult; (2) the strength of the packing member is inferior so that injection pressure cannot be increased during molding; and (3) the film-shaped packing member for which an aluminum laminate film is typically used has its surface formed of nylon, a resin, such as polyethylene terephthalate, polypropylene, or the like, so that it is not easily bondable to the resin for molding.

Accordingly, it is desirable to provide a battery pack and a manufacturing method therefor, capable of forming a uniformly thick coating layer on the surface of a packing member, without using molds or the like, and also capable of realizing high dimensional accuracy and high mechanical strength, as well as light weight and low cost.

In one embodiment of the present invention, there is provided a battery pack having a battery obtained by packing a battery element with a packing member, wherein the battery element is formed by winding or laminating an anode and a cathode through separators. The battery pack includes a frame member surrounding the packing member packing the battery element therewith, and a coating layer formed of a curable resin on surfaces of the packing member which are surrounded and demarcated by the frame member.

In another embodiment of the present invention, there is provided a manufacturing method for a battery pack having a battery, a frame member, and a coating layer, in which the battery is obtained by packing a battery element with a packing member, the battery element is formed by winding or laminating an anode and a cathode through separators, the frame member surrounds the packing member packing the battery element therewith, and the coating layer is formed of a curable resin on surfaces of the packing member which are surrounded and demarcated by the frame member. The manufacturing method includes the steps of forming the coating layer to be formed on the surfaces of the packing member by rotating the packing member about a dripping point from which the curable resin is dripped, and thereafter curing the curable resin.

According to the above-mentioned embodiments of the present invention, a battery pack and a manufacturing method therefor can be provided, in which a uniformly thick coating layer can be formed on the surfaces of the packing member without using molds, and high dimensional accuracy and high mechanical strength, as well as light weight and low cost can be realized.

DETAILED DESCRIPTION

Figure 1A:
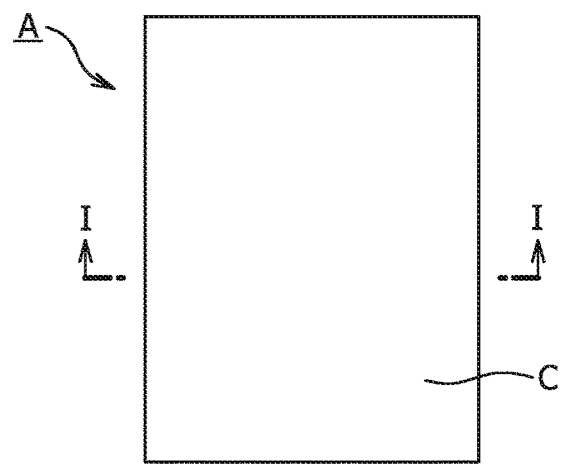
FIG. 1A is a plan view of a battery pack according to an embodiment of the present invention.
Figure 1B:
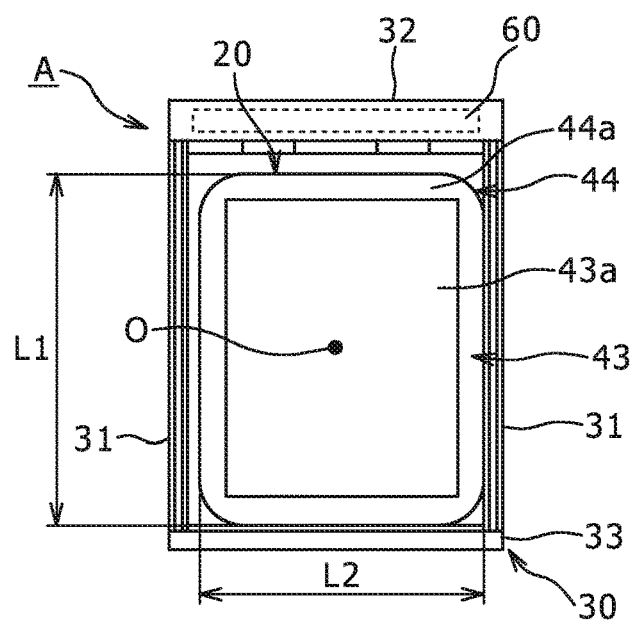
FIG. 1B is a front sectional view showing an internal structure of the battery pack.
Figure 1C:
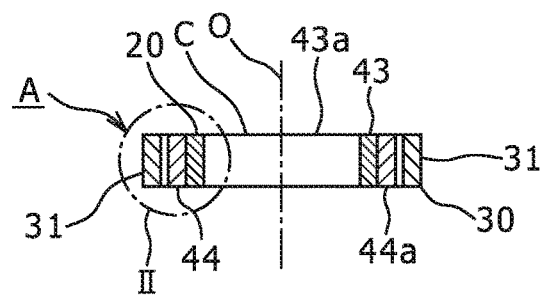
FIG. 1C is a sectional view taken along a line I-I shown in FIG. 1A.
Figure 2:
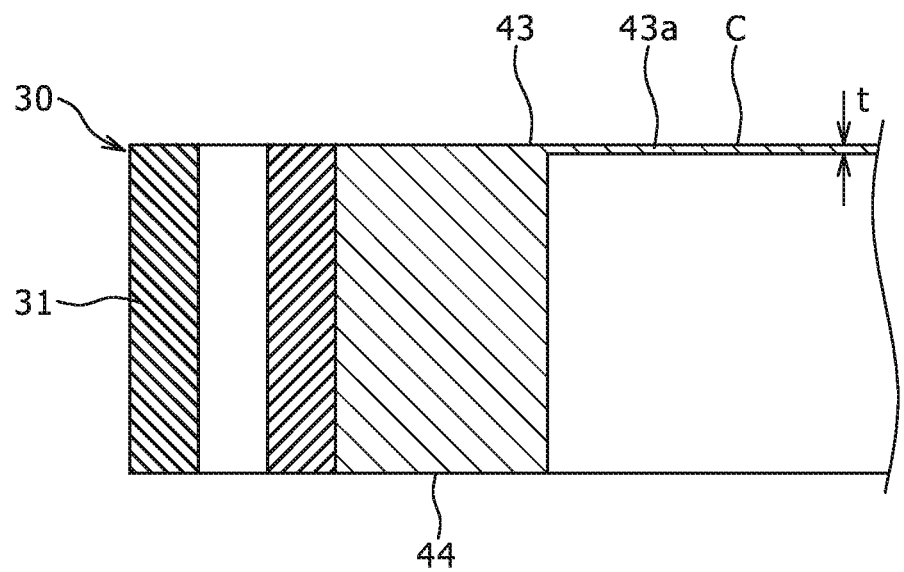
FIG. 2 is an enlarged view of a portion indicated by a surrounding line II in FIG. 1C.
Figure 3:
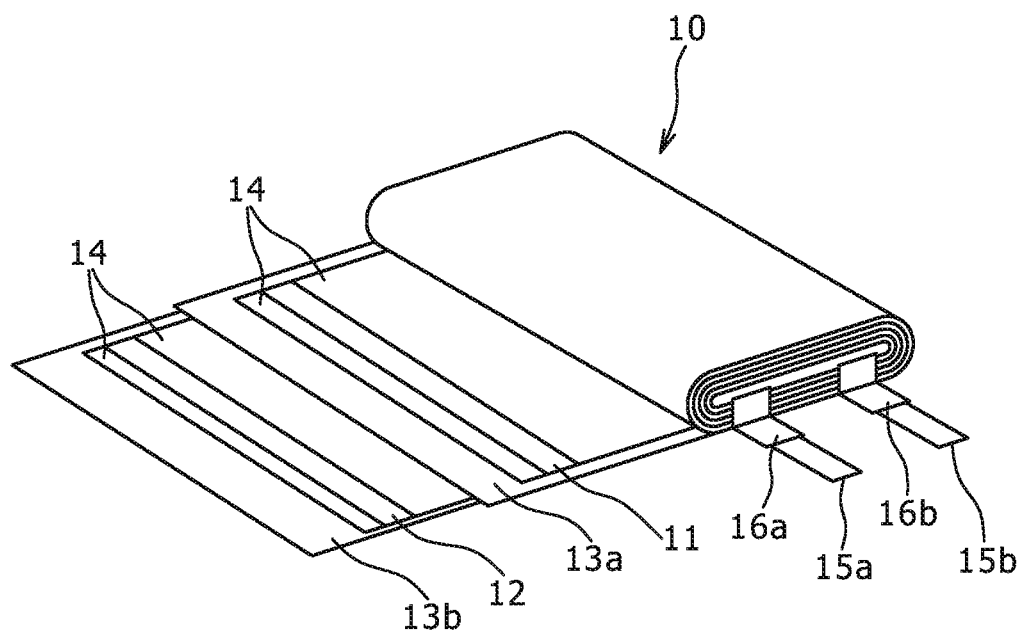
FIG. 3 is a perspective view showing a structure of a battery element.
Figure 4:
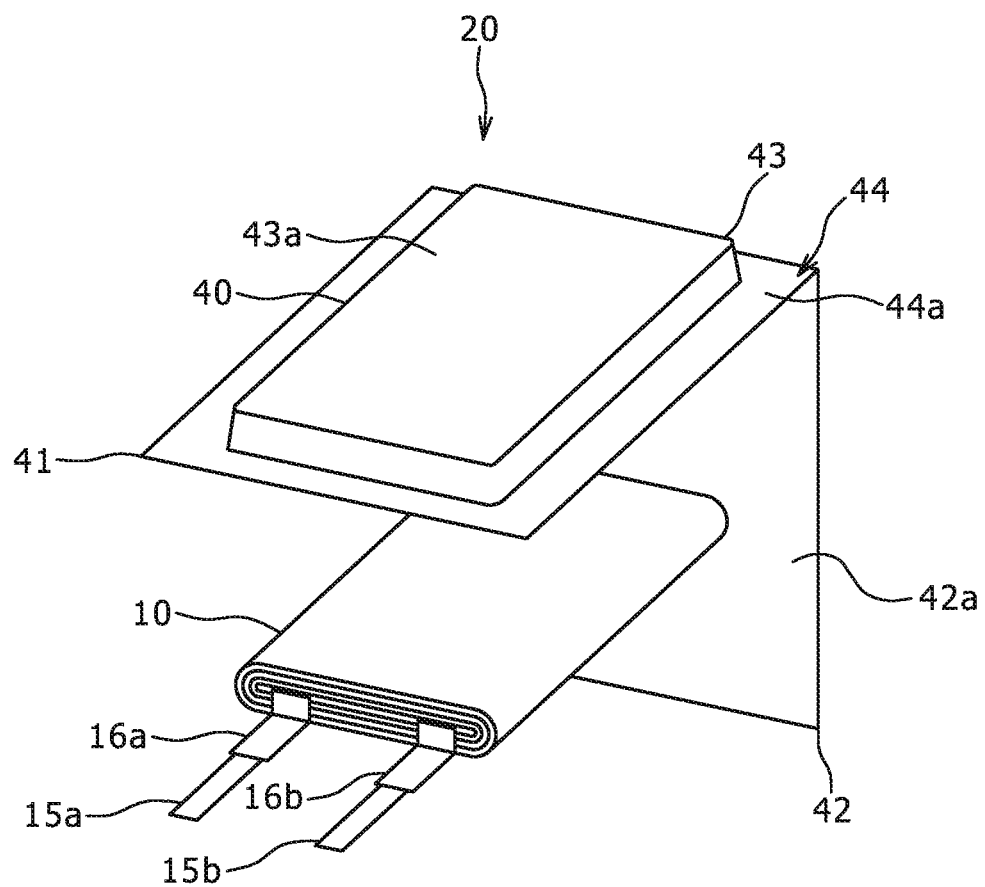
FIG. 4 is a perspective view showing the same battery element and a packing member.

An embodiment for carrying out the present invention will be described below with reference to the drawings. FIG. 1A is a plan view of a battery pack according to an embodiment of the present invention, FIG. 1B is a front sectional view showing an internal structure of the battery pack, and FIG. 1C is a sectional view taken along a line I-I shown in FIG. 1A. FIG. 2 is an enlarged view of a portion indicated by a surrounding line II in FIG. 1Cs. FIG. 3 is a perspective view showing a structure of a battery element. FIG. 4 is a perspective view showing the battery element and a packing member.

A battery pack A according to the embodiment of the present invention has a nonaqueous electrolyte secondary battery (hereinafter called simply as "battery") 20, and a frame member 30 surrounding this battery 20.

The battery 20 is of a polymer type formed by packing a battery element 10 with a packing member 40. The battery element 10 is formed by winding or laminating an anode 11 and a cathode 12 through separators 13a, 13b. The battery 20 is formed into a rectangular shape in the present embodiment (see FIGS. 3, 4).

More specifically, the battery element 10 is formed by sequentially laminating the belt-shaped anode 11, the separator 13a, the belt-shaped cathode 12 arranged to face the anode 11, and the separator 13b, and winding the resultant laminate in a longitudinal direction. The anode 11 and the cathode 12 each have both surfaces thereof coated with a gel electrolyte 14.

An anode terminal 15a connected to the anode 11 and a cathode terminal 15b connected to the cathode 12 extend from the battery element 10. The anode terminal 15a and the cathode terminal 15b are covered with sealants, not shown, each being a strip of resin such as maleic anhydride-modified polypropylene (PPa), in order to enhance adhesion to the packing member 40 (see FIG. 4).

The packing member 40 shown in the present embodiment is an aluminum laminate film, formed of a rectangular front plate 41 as viewed in plane, and a flat back plate 42 identically shaped and foldably monolithic with this front plate 41.

A length-to-width ratio L1/L2 of the packing member 40 shown in the present embodiment is set to be not less than 1 and not more than 1.3, where L1 is the long length and L2 is the short length.

When the four sides are equal in length in terms of the long and short lengths, L1/L2=1, and not less than 1.

The ratio L1/L2 is preferably be not more than 1.5, or more preferably not more than 1.3.

The closer the ratio L1/L2 is to 1, the more equidistant the respective sides are to a rotation center, allowing a resin for coating to be more evenly spread and hence preventing its thickness variations and facilitating the manufacture.

Conversely, if the ratio L1/L2 exceeds 1.5, assuming L1 is the long length and L2 is the short length, the resin tends to be thinner along the long sides than along the short sides, preventing the packing member from having a good appearance as a product and a required strength. If the resin is coated thicker overall to provide the required strength, a demerit arises that the volumetric energy density as the battery pack is impaired.

The front plate 41 is formed such that a casing portion 43 encasing the battery element 10 is projected, and a fusion-bonding portion 44 having a certain width extends all around the casing portion 43.

The front plate 41 and the back plate 42 are intimately sealed with each other by the front plate 41 being, e.g., thermally fusion-bonded, along the short sides of its fusion-bonding portion 44, to the back plate 42.

A laminate film having a single layer or two or more layer films may be usable. In the present embodiment, the laminate film includes a polyolefin film.

Surfaces 43a, 42a of the casing portion 43 formed on the packing member 40 are roughened such that the thickness of a later-described coating layer C becomes uniform. For the surface roughness, an arithmetic average roughness is set such that the thickness of the coating C becomes uniform.

In the present embodiment, the surface roughness is preferably set to not less than 1 µm and not more than 50 µm in terms of the arithmetic average roughness Ra specified by JIS B 0601.

On the basis of this setting, one can control the thickness of the resin coated consistently by a centrifugal force derived from rotation.

If the arithmetic mean roughness Ra is equal to or less than 1 μm, the centrifugal force is not affected so much as to control the resin thickness.

In that case, the ratio L1/L2, assuming L1 as long length and L2 as the short length, is desirably close to 1, and L1 is desirably as short as not more than 5 mm.

Furthermore, if the arithmetic average roughness Ra exceeds 50 μm, the spreading of the resin by the centrifugal force is limited so much and thickness variations in the resin coating are rather aggravated.

The arithmetic mean roughness Ra for the surface roughness specified by JIS B 0601 is calculated as follows.

First, the battery pack A is cut perpendicular to its largest surface to obtain a section.

The obtained section is imaged by an electron microscope, and roughness curves for sections of the surfaces 43a, 42a of the packing member 40 are checked compliant with what is defined in JIS B 0601. Then, sums of top heights and bottom depth in the respective roughness curves are obtained, and these sums, i.e., the roughness values are averaged, thereby calculating the arithmetic average roughness Ra.

It is noted that any height, for which the ratio of the smallest height to the largest height is not more than 10% according to JIS B 0601, is not included in the average calculation.

In the present embodiment, the surface roughness is gradually decreased toward an outside edge portion 43c of the casing portion 43 from a later-described dripping point O from which a curable resin is to be dripped.

The coating layer C is formed by curing the curable resin on the surfaces 43a, 44a, 42a of the packing member 40 surrounded and demarcated by the frame member 30, details of which will be described later.

As the curable resin, e.g., in addition to a urethane resin, an acrylic resin, an epoxy resin, and the like may be adopted. In the present embodiment, the coating C is formed of a composite material containing the resin and fillers, such as metallic oxide or metallic nitride.

The curable resin may preferably contain, as a component resin, a polymer having affinity, compatibility, and reactability with the fillers such as metallic oxide or metallic nitride, as well as having high dimensional accuracy and strength.

For example, a urethane resin, an acrylic resin, or an epoxy resin may suitably be used as a shape keeping polymer (polymer film). It is noted that the shape keeping polymer may be any of those having good adhesiveness to the metallic laminate film and superior in dimensional stability and moldability.

On the other hand, as inorganic fillers, oxides of silicon (Si), aluminum (Al), titanium (Ti), zirconium (Zr), zinc (Zn), and magnesium (Mg), or any arbitrary mixture of these oxides may be cited. Such metallic oxide fillers function to improve the hardness of the coating layer C, and are arranged in contact state with the shape keeping polymer. For example, these inorganic fillers may be mixed into the shape keeping polymer. In this case, the fillers are preferably dispersed evenly in the whole of the shape keeping polymer.

It is also preferable to use fillers having superior transparency when a photo-curing resin is used as a reaction-curable resin.

The mixing amount of the inorganic fillers may be variable according to the type of the shape keeping polymer. However, if the mixing amount is less than 3% with respect to the mass of the shape keeping polymer, the coating layer may not be hard enough, while if the mixing amount exceeds 60%, issues such as moldability and the brittleness of ceramic during manufacture may arise. Consequently, the mixing amount of the inorganic fillers to the mass of the shape keeping polymer may preferably be about 3-60%.

Furthermore, if the average grain diameter of the inorganic fillers is decreased, the hardness increases but chargeability during molding is affected, thereby potentially impairing the productivity. Meanwhile, if the average grain diameter of the inorganic fillers is increased, the target strength is hard to obtain, whereby there is a potentially that the dimensional accuracy as the battery pack is adversely affected. Considering these factors, the average grain diameter of the inorganic fillers may preferably be set to be 0.5-40 μm, or more preferably to 2-20 μm.

Furthermore, the inorganic fillers may be variously shaped, such as being spherical, scale-shaped, plate-shaped, and needle-shaped. Spherical fillers, although not particularly limited thereto, are preferable in that they are easy to produce and inexpensively available in a uniform average grain diameter. Needle-shaped fillers having a high aspect ratio are preferable in that they can easily increase the strength as fillers. Scale-shaped fillers are also preferable in that their chargeability can be increased with increasing filler content. It is noted that fillers having different average grain diameters or differently shaped fillers may be used by mixture, according to different applications.

As described above, the coating layer C may desirably have a shape keeping polymer and predetermined inorganic fillers, but may also contain various additives in addition to them. For example, a UV absorbent, a light stabilizer, a curing agent, or any mixture thereof may be added in the shape keeping polymer so that the shape keeping polymer can coexist with the metallic oxide fillers, a stabilizer, a lubricant, a processing aiding material, a plasticizer, a shock resistant aiding material, a colorant, the UV absorbent, and the like.

In the present embodiment, a thickness t of the coating layer C is set to not more than 1000 μm.

If the thickness of the coating layer C exceeds 1000 μm, for even the battery pack to which this coating layer C is formed, it may be hard to exhibit its merit in terms of the volumetric energy density. The thickness of the coating layer C is more preferably not more than 300 μm. A thinner coating layer C is better, as long as the required mechanical strength and shock resistance can be satisfied.

When the coating layer C is formed only by natural dripping with a later-described spin coat apparatus 50, it is more preferable that the resin to be dripped have a lower viscosity. It is also preferable that the surfaces of the packing member 40 be hydrophilic, not repellent against the liquid resin. If these two requirements cannot be met, the dripping pressure is adjusted and the pressure is increased if the resin is highly viscous and highly water-repellent.

By the way, the frame member 30 is formed by framing side framing members 31, 31, and upper framing member 32 and a lower framing member 33. The side framing members 31, 31 are spaced apart so as to sandwich the packing member 40 of the battery 20 from both sides. The upper and lower framing members 32, 33 are spaced apart so as to sandwich the packing member 40 vertically. The upper and lower framing members 32, 33 are assembled to both upper and lower ends of the side framing members 31, 31. These framing members are integrally formed using a predetermined resin (see FIGS. 1B, 1C).

The upper framing member 32 has a below-described circuit protecting board 60 embedded therein.

The circuit protecting board 60 includes a primary protecting circuit and a secondary protecting circuit, and also a PTC (Positive Temperature Coefficient), if necessary.

The primary protecting circuit, not shown, has functions of preventing overcharging to the battery element 10 and over-discharging to electronic equipment, not shown, from the battery element 10 when the battery element 10 of the battery pack A attached to the electronic equipment is charged.

The secondary protecting circuit, not shown, has a power supply fuse for stopping overcurrent when the overcurrent flows, and a temperature fuse for stopping supply of current when the use temperature of the battery element 10 becomes higher than predetermined value.

Furthermore, the PTC is arranged in the secondary protecting circuit, and is an example return type protecting element for electrically protecting the battery element 10.

That is, the PTC has a function of drastically increasing its resistance value when heated with temperature not less than predetermined degree, and serves to prevent issues caused by short-circuits between the anode and the cathode due to temperature rise, e.g., when the battery element 10 is heated due to external short-circuits or the like.

The above-mentioned circuit protecting board 60 is embedded in the upper framing member 32 in the process of forming the frame member 30.

It is noted that the upper framing member 32 and the lower framing member 33 may also have a buffer, not shown, embedded therein, the buffer serving to protect the protecting circuit board 60 and the battery 20.

Figure 5A:
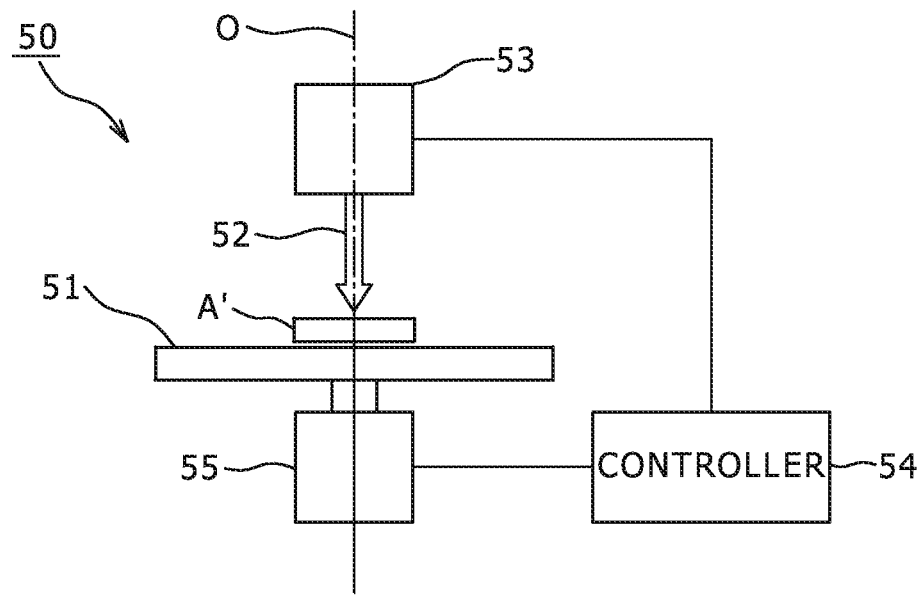
FIG. 5A is an explanatory diagram outlining a construction of an example spin coater.
Figure 5B:
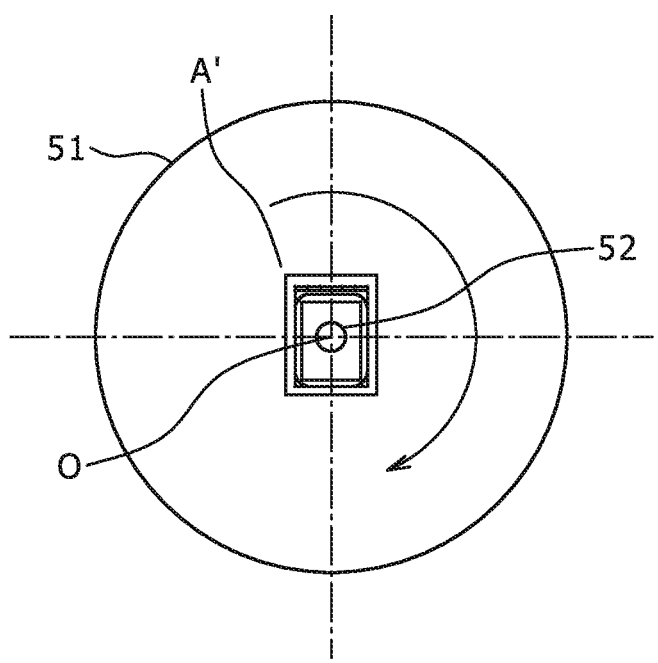
FIG. 5B is a schematic plan view showing a turntable and a battery pack before a coating layer is formed thereon, which is placed on the turntable.

A manufacturing method for the thus configured battery pack A will be described with reference to FIGS. 5A, 5B. FIG. 5A is an explanatory diagram outlining a configuration of an example spin coater, and FIG. 5B is a schematic plan view showing a turntable and the battery pack before the coating layer is formed thereon, which is placed on the turntable.

According to the example, spin coater 50 includes a turntable 51 rotated as driven by a motor 55 and the like, a nozzle 52 aligned with a rotation center axis O of the turntable 51, a dripping adjuster 53 for temporarily storing the resin for forming the coating layer C and dripping a predetermined amount of the resin from the nozzle 52, and a controller 54 controlling the turntable 51 and the dripping adjuster 53, as its main components.

The controller 54 has a control function of increasing/decreasing the number of revolutions of the turntable 51 according to the resin to be dripped and the like, an adjustment function of increasing/decreasing the dripping amount of, and hence the dripping pressure for, the resin to be dripped via the dripping adjuster 53, by executing predetermined programs.

The coating layer is formed by the thus configured spin coat apparatus 50 in the following way.

First, after packing the battery element 10 with the packing member 40, the front plate 41 of the packing member 40 is intimately sealed, along its fusion-bonding portion 44, with the back plate 42 by thermal fusion-bonding or the like, thereby assembling the battery 20.

Next, the coating layer C is formed on the surfaces 43a, 42a of the packing member 40 of the thus assembled battery 20.

Namely, the packing member 40 is fixed in place on the turntable 51, with the center of the casing portion 43 of the packing member 40 of the battery 20 fitted into the frame member 30, aligned with the rotation center axis O of the turntable 51.

The battery 20 is fixed to the turntable 51 by connecting a vacuum pump, not shown, into a sucking hole, not shown, formed at a fixing position of the turntable 51, and sucking a battery pack A' before the coating layer is formed thereon, to the turntable 51.

It is noted that the vacuum pump, not shown, may be driven by the controller 54 or manually.

Then, while rotating the turntable 51 at a predetermined number of revolutions, a predetermined amount of the curable resin is dripped onto the surfaces 43a, 42a of the packing member 40.

The dripped curable resin is spread over the surfaces 43a, 42a of the packing member 40 by a centrifugal force, thereby forming the coating layer C evenly over these surfaces 43a, 42a, and also driving off a redundant curable resin portion over the packing member 40 so that a space demarcated by the frame member 30, the casing portion 43, and the fusion-bonded portion 44 is loaded therewith.

In the process of dripping the curable resin, the turntable 51 is rotated preferably at a relatively low speed of about 20-100 rpm (SI unit: $S^{-1}$). Immediately after the dripping (injection), the motor 55 is driven and controlled by the controller 54 to increase the rotational speed so that a uniform layer is formed.

The rotational speed during the spin coating is intimately related with the thickness of the light-transmissive layer to be formed. The higher the rotational speed is, the thinner the formed coating layer becomes. Meanwhile, the curable resin is not particularly limited, and any urethane or epoxy acrylate resin may be usable.

After the rotation of the turntable 51 is stopped, the coating layer is irradiated with rays from, e.g., a UV lamp, not shown, to cure the UV curable resin forming the coating layer C. As a result, the battery pack A is completed.

The UV curable resin is made of, e.g., urethane or epoxy acrylate. The viscosity of the UV curable resin is selected from 50-1000 mPa·s (SI unit), preferably from 700-800 mPa·s.

The viscosity values of the UV curable resin are effective at 25° C. In addition, its glass transition temperature may range from 45-130° C., or preferably 75-110° C.

It is noted that when the coating layer C is formed of a thermosetting resin, the resin is cured by heating with an oven, not shown, instead of the UV lamp.

According to the battery pack A which is the embodiment of the present invention, a high-strength battery pack with a coating layer thinner than the related-art examples can be realized, and a smaller and lighter battery pack can also be realized.

Furthermore, by using any of a UV absorbent, a light stabilizer, and a curing agent together with metallic oxide fillers such as mentioned above, and by using any of resins such as a urethane resin, an acrylic resin, and an epoxy resin, the coating is made thinner than a metallic plate, and can be processed at high productivity.

For these reasons, not only the energy density of the obtained battery is improved, but also the yield is improved owing to ease of formation and high dimensional accuracy of the battery pack. In addition, the degree of freedom can be increased in designing the size, shape, and strength of the battery pack to accommodate various applications.

Figure 6A:
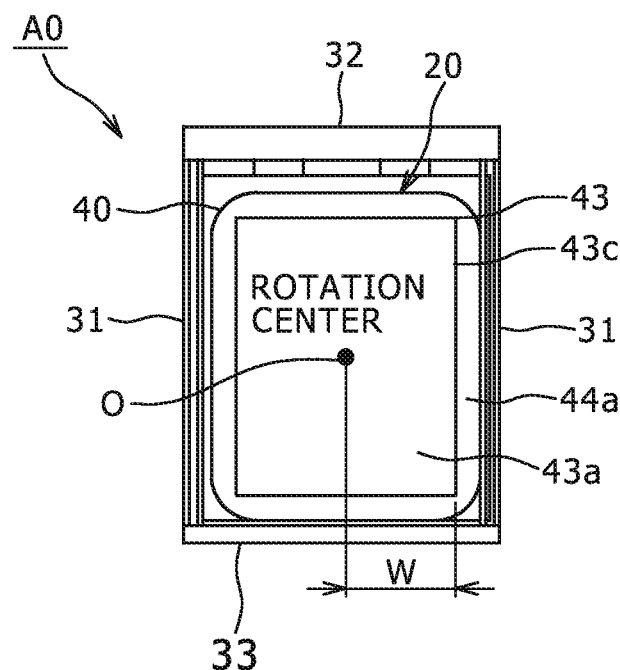
FIG. 6A is a plan view of a battery pack in which surfaces of its packing member are not roughened.
Figure 6B:
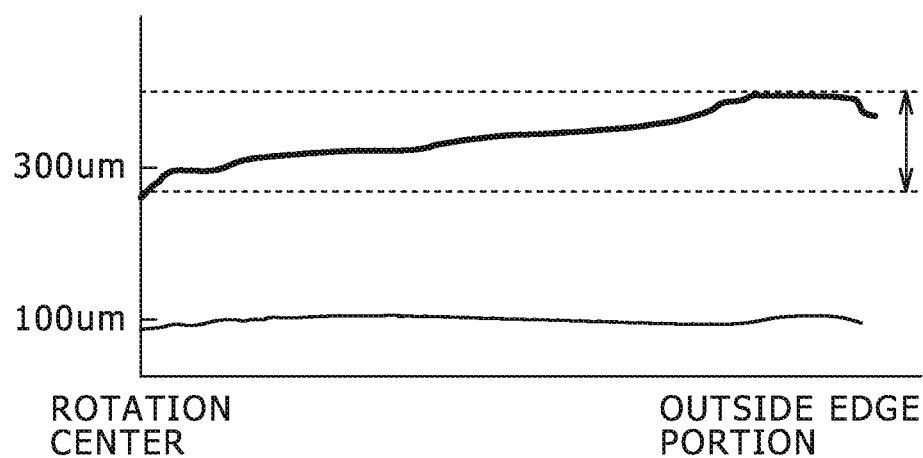
FIG. 6B is an explanatory diagram showing a relationship between the thickness of the packing member and the thickness of a coating layer.
Figure 7A:
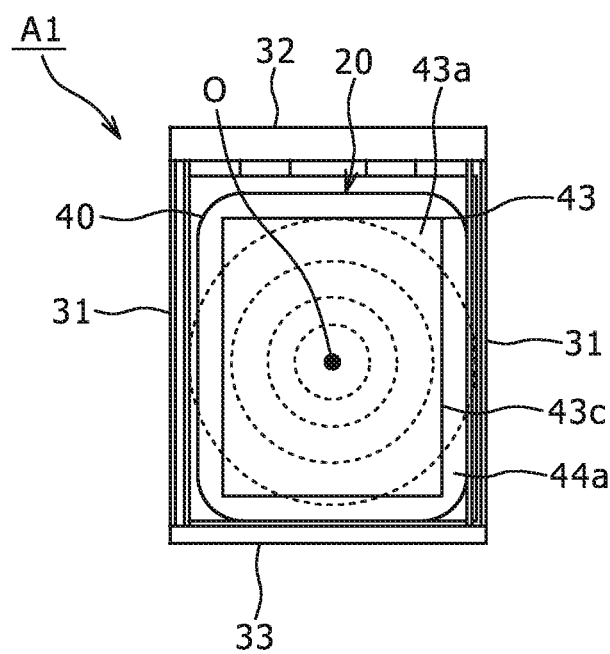
FIG. 7A is a plan view of a battery pack in which surfaces of its packing member are roughened.
Figure 7B:
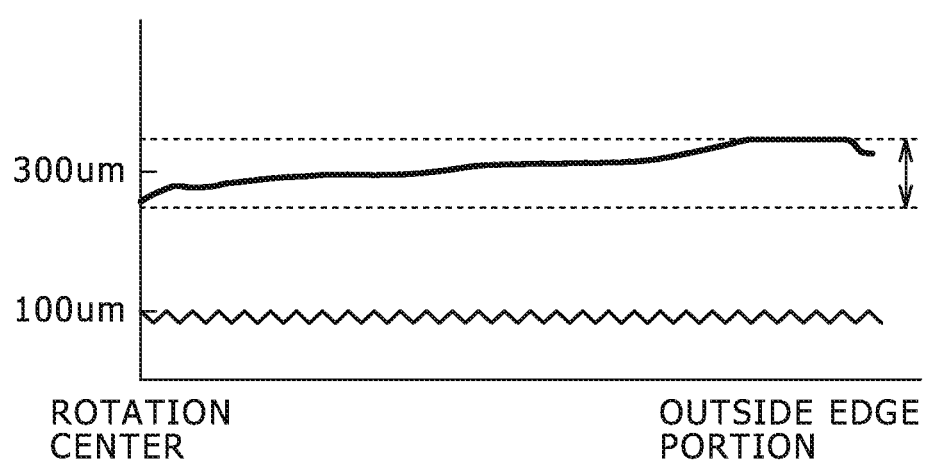
FIG. 7B is an explanatory diagram showing a relationship between the thickness of the packing member and the thickness of a coating layer.

By the way, an example in which the surfaces of the packing member are roughened to make the coating layer uniformly thick has been described in the above embodiment. Now, a comparative example is shown below in which surfaces of a battery pack are not roughened. FIG. 6A is a plan view of a battery pack A0 in which surfaces of its packing member are not roughened, and FIG. 6B is an explanatory diagram showing a relationship between the thickness of the packing member and the thickness of a coating layer. FIG. 7A is a plan view of a battery pack A1 in which surfaces of its packing member are roughened, and FIG. 7B is an explanatory diagram showing a relationship between the thickness of the packing member and the thickness of a coating layer. It is noted that in FIGS. 6B, 7B, (a) denotes the thickness of the coating layer and (b) denotes the thickness of the packing member, and an abscissa axis corresponds to a distance W from the rotation center axis O to an outside edge portion (long side) 43c shown in FIGS. 6A, 7A.

The packing member A1 of the battery pack shown in FIG. 7A has its surface roughness varied concentrically from the rotation center axis O. When compared with the battery pack A0 shown in FIG. 6A, it is apparent that the packing member A1 exhibits smaller thickness variations in the coating layer.

The packing member in which its surface roughness is varied concentrically from the rotation center axis O to make the coating layer uniformly thick has been described in FIGS. 7A, 7B. Instead, packing members shown in FIGS. 8A, 8B to 11A, 11B may also be acceptable. It is noted that parts and components equivalent to those described in the above embodiment are denoted by the same reference numerals, and their detailed description will be omitted.

Figure 8A:
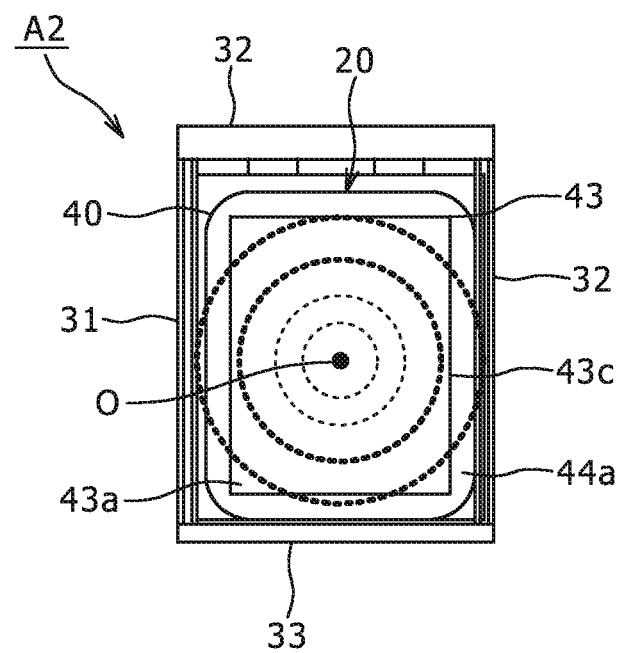
FIG. 8A is a plan view of a battery pack in which surfaces of its packing member are roughened.
Figure 8B:
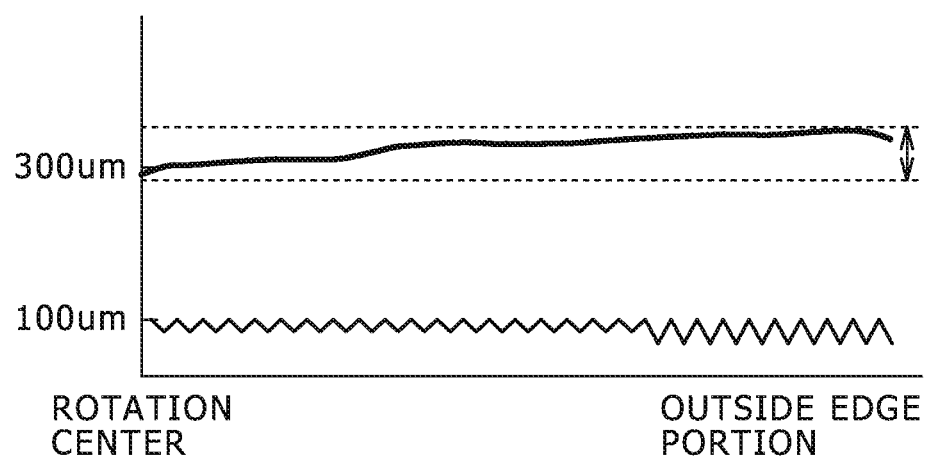
FIG. 8B is an explanatory diagram showing a relationship between the thickness of the packing member and the thickness of a coating layer.

FIG. 8A is a plan view of a battery pack A2 in which surfaces of its packing member are roughened, and FIG. 8B is an explanatory diagram showing a relationship between the thickness of the packing member and the thickness of a coating layer.

In a surface of the packing member 40 of the battery pack A2, a surface area from a point between a rotation center axis O and an outside edge portion 43c, to the outside edge portion 43c is made into a rough surface roughness.

Figure 9A:
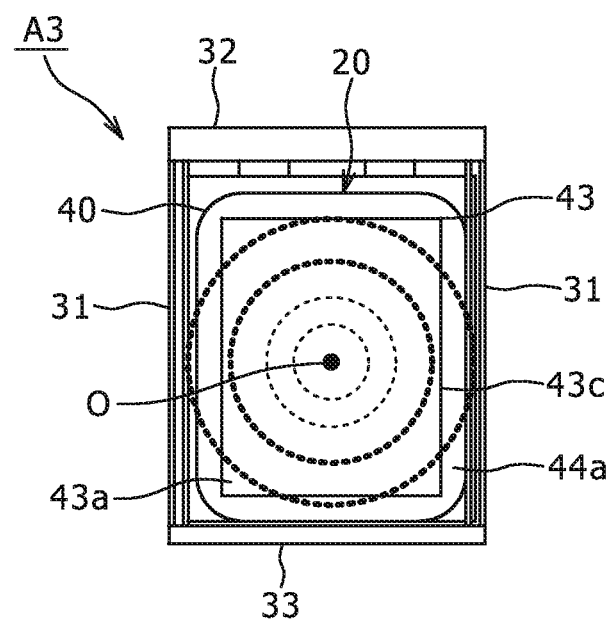
FIG. 9A is a plan view of a battery pack in which surfaces of its packing member are roughened.
Figure 9B:
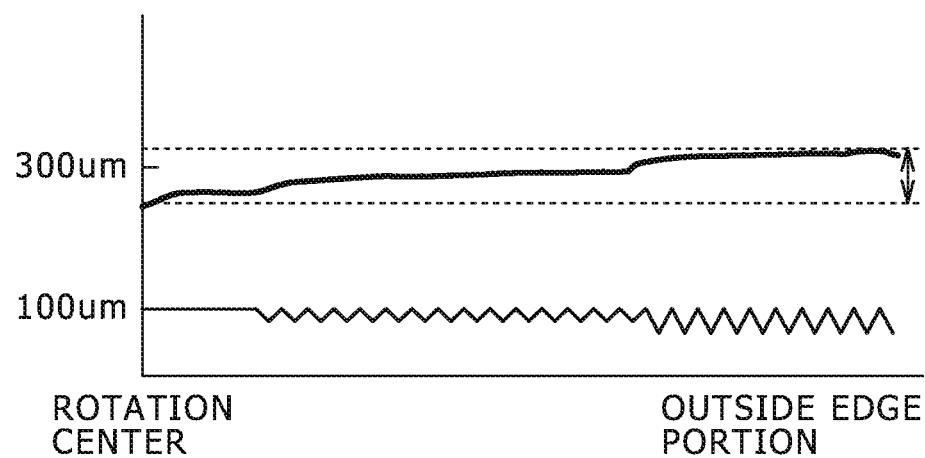
FIG. 9B is an explanatory diagram showing a relationship between the thickness of the packing member and the thickness of a coating.

FIG. 9A is a plan view of a battery pack A3 in which surfaces of its packing member are roughened, and FIG. 9B is an explanatory diagram showing a relationship between the thickness of the packing member and the thickness of a coating layer.

In a surface of the packing member 40 of the battery pack A3, a surface area from a rotation center axis O to a point between the rotation center axis O and an outside edge portion 43c is made into a fine surface roughness, and also a surface area from the point to the outside edge portion 43c is made into a rough surface roughness.

In this case, a large change in the thickness of the coating layer C near the outside edge portion 43c of the packing member 40 can be suppressed, and also its thickness variations become small.

Figure 10A:
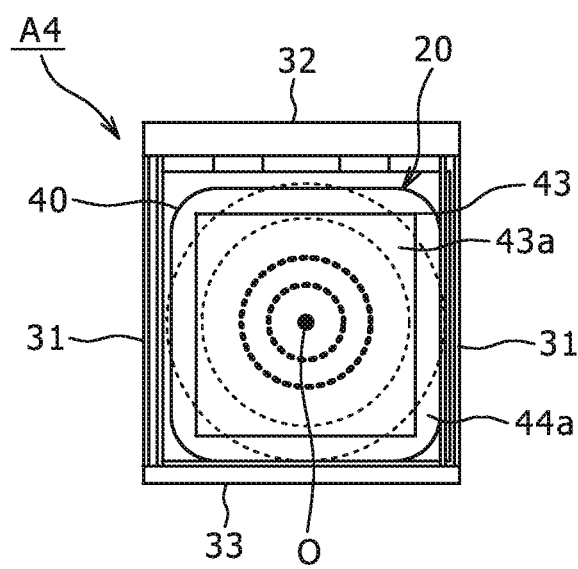
FIG. 10A is a plan view of a battery pack in which surfaces of its packing member are roughened.
Figure 10B:
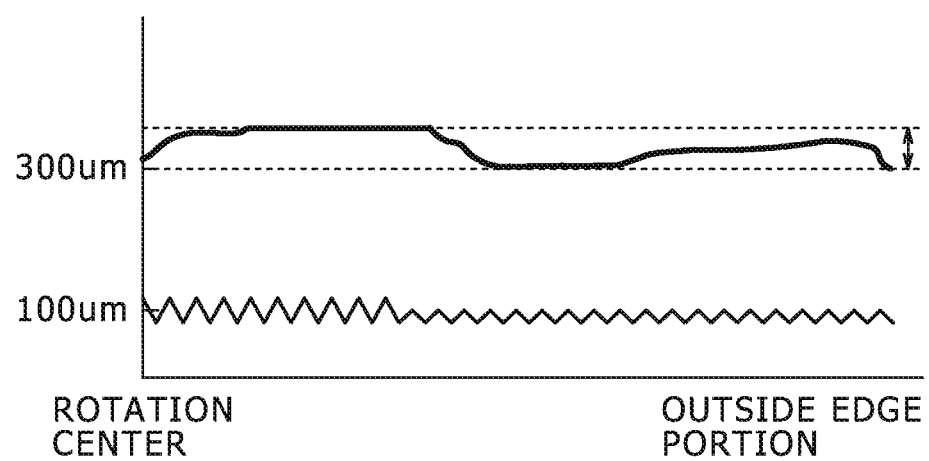
FIG. 10B is an explanatory diagram showing a relationship between the thickness of the packing member and the thickness of a coating layer.

FIG. 10A is a plan view of a battery pack A4 in which surfaces of its packing member are roughened, and FIG. 10B is an explanatory diagram showing a relationship between the thickness of the packing member and the thickness of a coating layer.

In a surface of the packing member 40 of the battery pack A4, a surface area from a rotation center axis O to a point between the rotation center axis O and an outside edge portion 43c is made into a rough surface roughness, and also a surface area from the point to the outside edge portion 43c is made into a fine surface roughness.

Figure 11A:
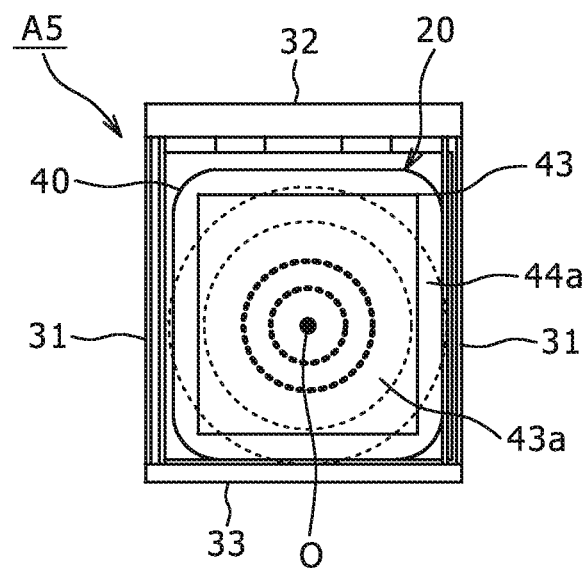
FIG. 11A is a plan view of a battery pack in which surfaces of its packing member are roughened.
Figure 11B:
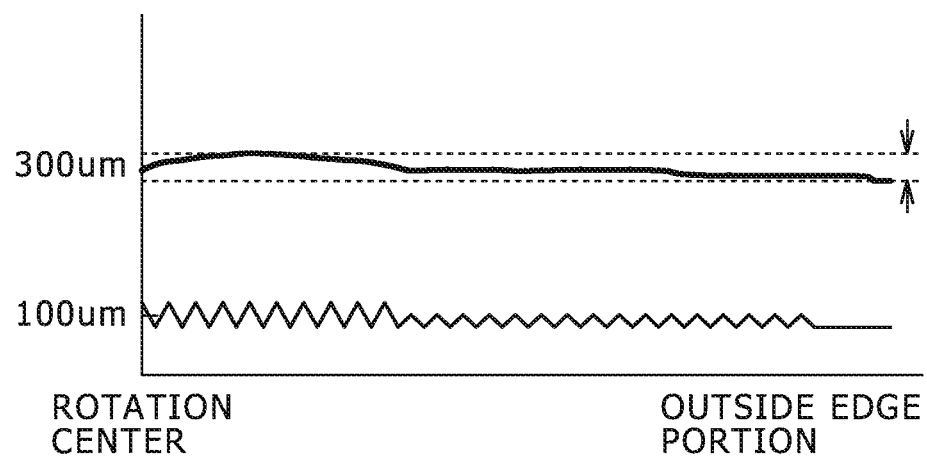
FIG. 11B is an explanatory diagram showing a relationship between the thickness of the packing member and the thickness of a coating layer.

FIG. 11A is a plan view of a battery pack A5 in which surfaces of its packing member are roughened, and FIG. 11B is an explanatory diagram showing a relationship between the thickness of the packing member and the thickness of a coating layer.

In a surface of the packing member 40 of the battery pack A5, a surface area from a rotation center axis O to a point between the rotation center axis O and an outside edge portion 43c is made into a rough surface roughness, and also a surface area from the point to the outside edge portion 43c is made into a fine surface roughness.

In this case, a large increase in the thickness of the coating layer C near the outside edge portion 43c of the packing member 40 can be eliminated, and also its thickness can be flattened and its thickness variations become small.

In FIGS. 7A-11B mentioned above, the battery packs in each of which the surface roughness of the packing member is varied to make the thickness of the coating layer uniform have been described. Battery packs such as shown in FIGS. 12A, 12B may also be acceptable, in each of which grooves are formed in surfaces of the packing member to make the thickness of a coating layer uniform.

Figure 12A:
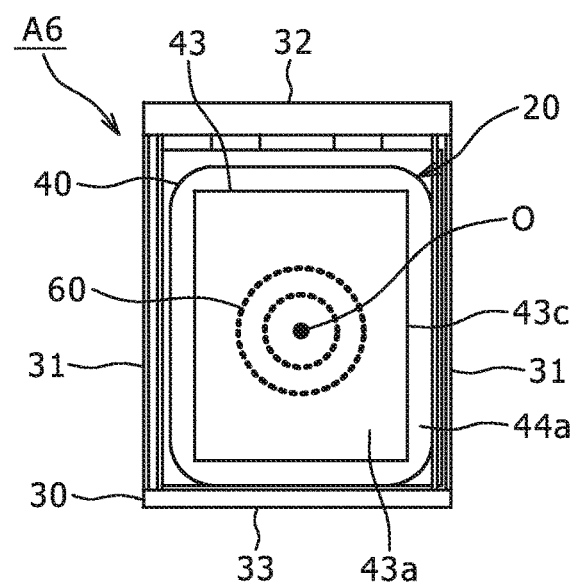
FIG. 12A is a plan view showing an example of grooves for making the thickness of a coating uniform.
Figure 12B:
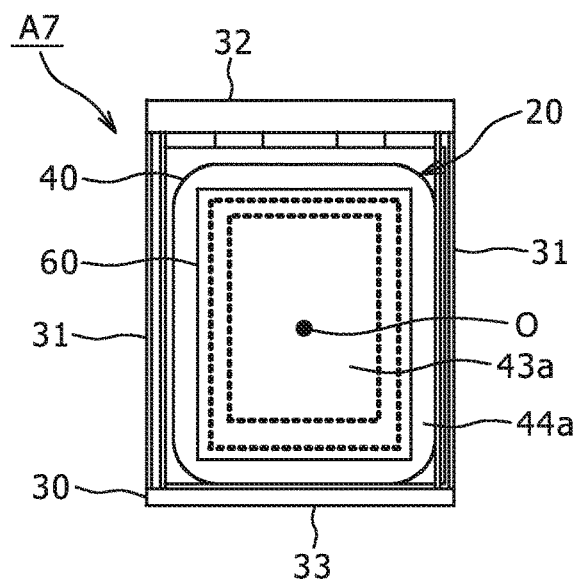
FIG. 12B is a plan view showing another example of grooves.
Figure 12C:
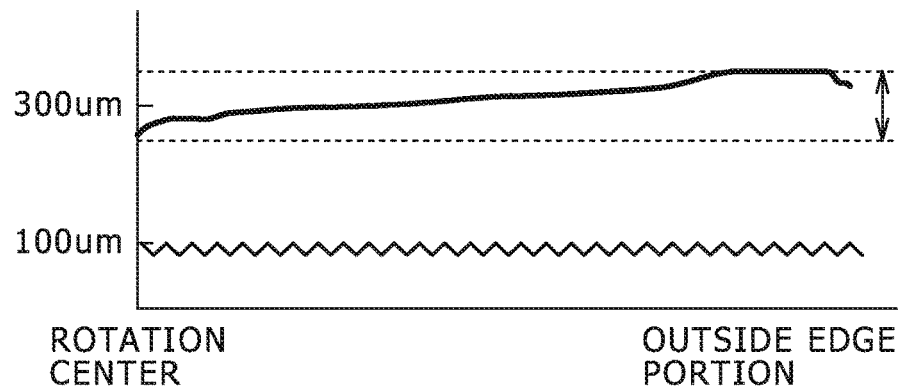
FIG. 12C is an explanatory diagram showing a relationship between the thickness of a packing member and the thickness of the coating layer.

FIG. 12A is a plan view showing an example of grooves for making the thickness of the coating layer uniform, FIG. 12B is a plan view showing another example of grooves, and FIG. 12C is an explanatory diagram showing a relationship between the thickness of a packing member and the thickness of the coating layer.

A packing member 40 of a battery pack A6 shown in FIG. 12A has cubic grooves 60 . . . formed in array on a surface 43a thereof so as to be spaced apart from each other at a predetermined equal angle space along the circumference of each of two circles having different radii, near a rotation center axis O.

Also, a packing member 40 of a battery pack A6 shown in FIG. 12B has cubic grooves 60 formed in array on a surface 43a thereof so as to be spaced apart from each other at equal intervals along an outside edge portion 43a of a casing portion 43.

With the grooves 60 shown in any of FIGS. 12A, 12B, a coating layer exhibiting small thickness variations can be formed, as shown in FIG. 12C.

EXAMPLES

TABLE 1

| | RESIN | CURING METHOD | CURING TIME | VISCOSITY mPa·s | SURFACE ROUGHNESS Ra AT ROTATION CENTER PORTION | INTERMEDIATE SURFACE ROUGHNESS Ra BETWEEN CENTER PORTION AND SIDES | SURFACE ROUGHNESS Ra ALONG RECTANGULAR SIDE PORITONS | CHANGE IN SURFACE ROUGHNESS | BATTERY THICKNESS (mm) |
|---|---|---|---|---|---|---|---|---|---|
| EXAMPLE 1 | EPOXY | LEFT AT AMBIENT TEMPERATURE | 1 DAY | 1200 | 0.5 | 0.5 | 0.5 | NONE | 5 |
| EXAMPLE 2 | EPOXY | UV RAYS | 5 SECONDS | 40 | 0.9 | 0.9 | 0.9 | NONE | 5 |
| EXAMPLE 3 | EPOXY | 90° C. | 5 MINUTES | 1000 | 52 | 52 | 52 | NONE | 5 |
| EXAMPLE 4 | ACRYL | UV RAYS | 15 SECONDS | 50 | 1 | 1 | 1 | NONE | 5 |
| EXAMPLE 5 | URETHANE ACRYLATE | UV RAYS | 10 SECONDS | 70 | 50 | 50 | 50 | NONE | 5 |
| EXAMPLE 6 | URETHANE | 70° C. | 3 MINUTES | 800 | 0.5 | 0.5 | 15 | 1 STEP | 5 |
| EXAMPLE 7 | URETHANE | 70° C. | 2 MINUTES | 100 | 15 | 15 | 0.5 | 1 STEP | 5 |
| EXAMPLE 8 | EPOXY | 70° C. | 1 MINUTE | 100 | 15 | 15 | 30 | 1 STEP | 5 |
| EXAMPLE 9 | ACRYL | UV RAYS | 5 SECONDS | 100 | 30 | 30 | 15 | 1 STEP | 5 |
| EXAMPLE 10 | ACRYL | UV RAYS | 5 SECONDS | 100 | 0.5 | 10 | 30 | 2 STEPS | 5 |
| EXAMPLE 11 | URETHANE ACRYLATE | UV RAYS | 5 SECONDS | 100 | 30 | 10 | 0.5 | 2 STEPS | 5 |

EFFECTS (REFERENCE)

| | BATTERY LENGTH (mm) | BATTERY WIDTH (mm) | LENGTH-TO-WIDTH RATIO OF BATTERY | VARIATIONS IN COATED SURFACES (μm) | PACKING MEMBER | THICKNESS AFTER COATING (μm) | RATED ENERGY DENSITY (Wh/l) | 10-TIMES DROPPING TEST FROM HEIGHT OF 2 m | DIMENSIONAL CHANGE Δt AFTER 50-TIMES DROPPING TEST FROM HEIGHT OF 1.2 m |
|---|---|---|---|---|---|---|---|---|---|
| EXAMPLE 1 | 35 | 69 | 1.97 | 30 | ALUMINUM LAMINATE | 150 | 505 | OK FOR ALL 10 | CRACK/1.2 |
| EXAMPLE 2 | 34 | 50 | 1.47 | 30 | ALUMINUM LAMINATE | 150 | 505 | OK FOR ALL 10 | CRACK/1.2 |
| EXAMPLE 3 | 34 | 43 | 1.26 | 20 | ALUMINUM LAMINATE | 150 | 505 | OK FOR ALL 10 | CRACK/1.2 |
| EXAMPLE 4 | 34 | 38 | 1.12 | 15 | ALUMINUM LAMINATE | 150 | 505 | OK FOR ALL 10 | 0.9 |
| EXAMPLE 5 | 34 | 38 | 1.12 | 15 | ALUMINUM LAMINATE | 100 | 525 | OK FOR ALL 10 | 0.8 |
| EXAMPLE 6 | 34 | 38 | 1.12 | 12 | ALUMINUM LAMINATE | 80 | 545 | OK FOR ALL 10 | 0.4 |
| EXAMPLE 7 | 34 | 38 | 1.12 | 11 | ALUMINUM LAMINATE + POLYETHYLENE FILM | 50 | 555 | OK FOR ALL 10 | 0.4 |

TABLE 1-continued

| | | | | | | | | |
|---|---|---|---|---|---|---|---|---|
| EXAMPLE 8 | 34 | 38 | 1.12 | 8 | PET FILM (DOUBLE LAYERS) | 50 | 570 | OK FOR ALL 10 | 0.2 |
| EXAMPLE 9 | 34 | 36 | 1.06 | 5 | POLYETHYELENE FILM (SINGLE LAYER) | 50 | 620 | OK FOR ALL 10 | 0.1 |
| EXAMPLE 10 | 34 | 36 | 1.06 | 5 | POLYETHYELENE FILM (SINGLE LAYER) | 50 | 620 | OK FOR ALL 10 | 0.1 |
| EXAMPLE 11 | 34 | 36 | 1.06 | 2 | POLYETHYELENE FILM (SINGLE LAYER) | 50 | 620 | OK FOR ALL 10 | 0.1 |

Table 1 shows relationships between factors and test results. The factors are the above-mentioned curable resin, curing method, curing time, viscosity, surface roughness at rotation center portion, intermediate surface roughness between center portion and sides, surface roughness along rectangular side portions, change in surface roughness, battery length, battery width, length-to-width ratio of battery, variations in coated surfaces, material of packing member, thickness after coating, and rated energy density. The results of a test in which battery packs were dropped 10 times from a height of 2 meters are shown. For reference, dimensional change after a test in which the battery packs were dropped 50 times from a height of 1.2 meters is additionally shown.

It is noted that the "intermediate surface roughness between center portion and sides" means a surface roughness at an intermediate position between the rotation center axis O and the outside edge portion 43a, and the "surface roughness along rectangular side portions" is synonymous with a surface roughness near the outside edge portion 43a.

As is apparent from Table 1 shown above, according to Examples 1-11 pertaining to the present invention, an evenly thick coating can be formed on the surfaces of the packing member without use of molds or the like.

Also, high dimensional accuracy, high mechanical strength, as well as small weight and low cost can be realized.

It is noted that the present invention is not limited to the above-described embodiment, but may include the following modified embodiments.

While the example in which the coating layer is formed by a spin coating method has been described in the above embodiment, other formation methods may be applicable. Specifically, such other methods include roll coating, die coating, dip coating, spray coating, casting, and the like.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2008-017289 filed in the Japanese Patent Office on Jan. 29, 2008, the entire content of which being incorporated herein by reference.

What is claimed is:

1. A battery pack having a battery provided by packing a battery element with a packing member, the battery element being provided by winding or laminating an anode and a cathode through separators, the battery pack comprising:
    a frame member surrounding outer edges of the packing member packing the battery element; and
    a coating layer including a curable resin provided on surfaces of the packing member which are surrounded and demarcated by the frame member,
    wherein the coating layer is provided on the surfaces of the packing member,
    wherein the frame member comprises side framing members, an upper framing member and a lower framing member,
    wherein the side framing members are spaced apart so as to sandwich the packing member of the battery from both sides,
    wherein the upper and lower framing members are spaced apart so as to sandwich the packing member vertically,
    wherein the upper and lower framing members are assembled to both upper and lower ends of the side framing members,
    wherein the upper framing member, the lower framing member and the side framing members are integrally formed,
    wherein the coating layer forms an outermost surface of the battery pack,
    wherein the packing member has a length-to-width ratio of not less than 1 and not more than 1.3,
    wherein the coating layer further includes an inorganic filler selected from the group consisting of an aluminum oxide, a zirconium oxide, a zinc oxide, a magnesium oxide and combinations thereof,
    wherein the amount of the inorganic filler to the mass of the resin is 3% to 60%,
    wherein the average diameter of the inorganic filler is 0.5 µm to 40 µm, and
    wherein a roughness of a center portion of the packing member is larger than a roughness of an edge portion of the packing member and a thickness of a center portion of the coating layer is larger than a thickness of an edge portion of the coating layer.

2. The battery pack according to claim 1, wherein the curable resin includes one or both of a UV curable resin and a thermosetting resin.

3. The battery pack according to claim 1, wherein the curable resin is one or more of a urethane resin, an acrylic resin, and an epoxy resin.

4. The battery pack according to claim 1, wherein the surfaces of the packing member have an arithmetic average surface roughness $R_a$ of 1 µm to 50 µm.

5. The battery pack according to claim 1, wherein the coating layer has a uniform thickness of 1000 µm or less.

6. The battery pack according to claim 5, wherein the coating layer has a uniform thickness of 300 µm or less.

7. The battery pack according to claim 1, wherein the surfaces of the packing member comprise grooves.

8. The battery pack according to claim 1, wherein the packing member includes an aluminum laminate film.

9. The battery pack according to claim 1, wherein the coating layer further includes an additive.

10. The battery pack according to claim 9, wherein the additive is selected from the group consisting of a UV absorbent, a light stabilizer, a curing agent, a stabilizer, a lubricant, a processing aiding material, a plasticizer, a shock resistant aiding material, a colorant and combinations thereof.

11. The battery pack according to claim 1, wherein the upper framing member has a circuit protecting board provided therein.

12. An electric device comprising the battery pack according to claim 1.

13. The battery pack according to claim 1, wherein the length-to-width ratio is 1.

14. The battery pack according to claim 1, wherein the average diameter of the inorganic filler is 2 µm to 20 µm.

15. The battery pack according to claim 1, wherein the inorganic filler includes one or more of a spherical-shaped inorganic filler, a scale-shaped inorganic filler, a plate-shaped inorganic filler, and a needle-shaped inorganic filler.

* * * * *